United States Patent [19]

Boykin et al.

[11] 4,152,936

[45] May 8, 1979

[54] REMOTELY CONTROLLED RETRACTABLE INSERTION FLOWMETER

[75] Inventors: John C. Boykin, Dallas; Edward R. Bryan, Wylie; Don A. Pfautsch, Richardson, all of Tex.

[73] Assignee: Electronic Flo-Meters, Inc., Dallas, Tex.

[21] Appl. No.: 813,949

[22] Filed: Jul. 8, 1977

[51] Int. Cl.² .......................... G01F 1/10; G01F 15/18
[52] U.S. Cl. ..................................... 73/198; 73/231 R
[58] Field of Search ................ 73/194 R, 198, 231 R, 73/187, 195, 196, 86

[56] References Cited

U.S. PATENT DOCUMENTS

| | | | |
|---|---|---|---|
| 512,269 | 1/1894 | Bishop | 73/187 |
| 1,403,894 | 1/1922 | Christensen | 73/187 |
| 2,089,134 | 8/1937 | Petroff | 73/187 X |
| 2,870,629 | 1/1959 | Willis | 73/86 |
| 3,007,340 | 11/1961 | Kraftson | 73/86 X |
| 3,691,846 | 9/1972 | Ingold | 73/86 X |
| 3,771,363 | 11/1973 | Stapler | 73/231 R |

*Primary Examiner*—James J. Gill
*Attorney, Agent, or Firm*—Richards, Harris & Medlock

[57] ABSTRACT

An insertion flowmeter apparatus for measurement of the fluid flow in a pipeline, particularly an oil and gas pipeline, utilizes a fluid-pressure actuated piston within a cylinder to insert and retract a stem having a turbine meter at the end laterally through the side wall of the pipeline. The retractable insertion flowmeter apparatus disclosed includes an hydraulic cylinder having a mounting flange on a first end for attachment to a flanged riser extending out of the wall of the pipeline, with an end plate provided on the second end of the cylinder. Both the mounting flange and the end plate have ports that communicate with the interior of the cylinder. A piston is disposed in the hydraulic cylinder for longitudinal movement therein in response to the introduction through the ports of pressurized fluid. The stem that carries the turbine meter extends longitudinally through the hydraulic cylinder and is secured to the piston. First and second guide pins are secured to the upper end of the stem by a yoke and extend parallel to the stem. The end plate at the second end of the hydraulic cylinder is provided with a flange having guide openings therein through which the guide pins pass. The apparatus is operable in response to control signals in the form of a pressurized fluid to translate the stem to either insert the turbine meter to the proper location within the pipeline or to retract the turbine meter from the pipeline into the riser.

11 Claims, 2 Drawing Figures

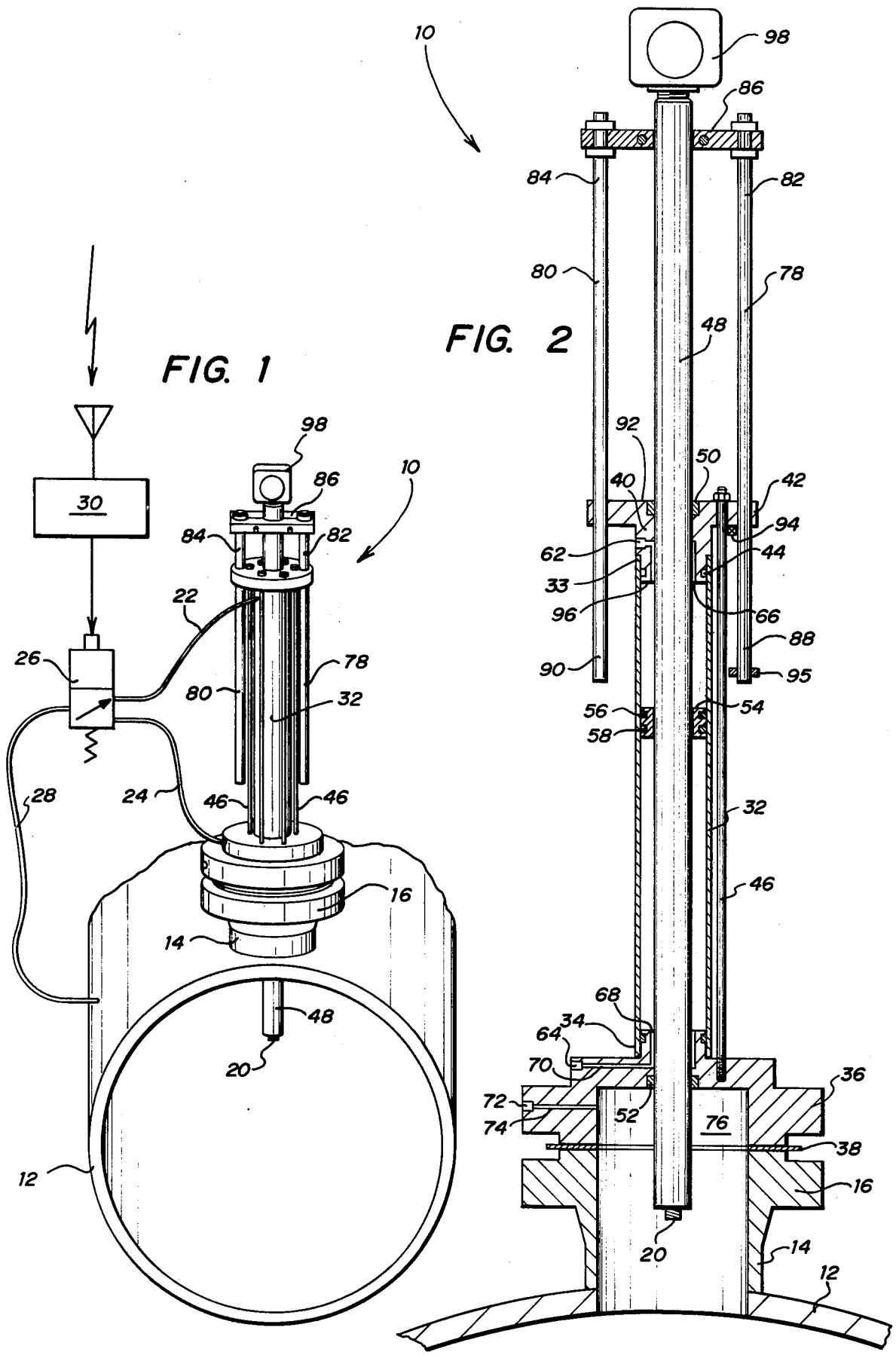

REMOTELY CONTROLLED RETRACTABLE INSERTION FLOWMETER

BACKGROUND OF THE INVENTION

The present invention relates to a flowmeter for measuring the flow of a fluid through a pipeline. More particularly, the present invention relates to an insertion flowmeter that permits a fluid flow detector to be automatically inserted into the fluid flow within the pipeline or retracted from the pipeline.

Insertion flowmeters for detecting the fluid flow through a pipeline and converting the data to engineering units are finding use in a wide variety of applications which include mass flow measurement and pipeline leak detection. Insertion flowmeters basically consist of a turbine meter on a stem, which in inserted into the fluid flow within a pipeline. The turbine meter comprises a rotor assembly having a precision rotor that turns through a magnetic field of force. As the rotor turns, passage of the blades past a pick-up sensor cuts the lines of force of the magnetic field and generates electronic pulses. The pulse output is applied to an electronic unit that converts the raw pulses from the turbine meter into engineering units for direct reading in standard cubic feet, pounds, kilograms, etc. Typically, the electronic units are frequency to voltage converters with rate indicators or linear analog control outputs. The electronic units can also, however, be flow computers, flare stack controllers, or leak detection systems.

Insertion flowmeters are installed on a section of pipeline by welding a flanged riser to the side wall of a pipeline. A flanged valve body is bolted on the riser. The valve includes a threaded stem which carries the rotor on the lower end thereof. To insert the turbine meter rotor into the fluid flowing in the pipeline or retract the rotor from the pipeline and into the riser, the valve stem is advanced into or backed out of the valve body by manual rotation. It has been found that after extended periods of use, the threads on the valve stem have a tendency to become galled and difficulty is experienced in movement of the stem.

Another problem presented by prior art insertion flowmeters is that on lengthly pipelines through sparsely populated or unpopulated areas, many of the flowmeters will be located at unmanned locations. Therefore, if it is necessary to retract a turbine meter from within the pipeline as, for example, when it is necessary to run a pig through the pipeline to clean parafin buildup therefrom, service personnel must be sent out to each unmanned location to manually retract the turbine wheel.

Accordingly, it would be most advantageous to provide an insertion flowmeter that does not utilize a threaded valve stem for effecting insertion and retraction of the turbine meter rotor. Also, it would be desirable to provide insertion flowmeter apparatus that can be remotely controlled from a distance of several hundred or even thousands of miles away from the actual location of the flowmeter itself.

SUMMARY OF THE INVENTION

The present invention is directed to a retractable insertion flowmeter apparatus for use on fluid carrying pipelines, which apparatus can be controlled by signals initiated by commands received from a location remote to the installation site of the apparatus to insert and retract a fluid flow detection device.

In accordance with the present invention, a retractable insertion flowmeter apparatus having a device for detecting the flow of fluid in a pipeline further includes a mechanism operable in response to a control signal to translate the fluid flow detection device laterally of the fluid flow for inserting or retracting the device with respect to the fluid flow. The apparatus further comprises structure for limiting the travel of the insertion and retraction mechanism.

In a more particular aspect, apparatus in accordance with the present invention utilizes a pressurized fluid actuated mechanism, such as an hydraulic cylinder, for translating the fluid flow detection device. The fluid actuated mechanism has a cylinder having first and second spaced apart fluid communication ports opening to the interior of the cylinder. A stem extends through the cylinder. A piston positioned within the cylinder between the first and second communication ports is secured to the stem and is operable under the influence of fluid pressure admitted through the ports to translate the stem.

In another more particular aspect of the present invention, the structure for limiting the travel of the insertion and retraction mechanism is a member movable with the stem for abutting a stop. Travel of the stem during insertion of the flow detection device into the fluid flow in the pipeline is halted upon the member abutting the stop. Travel is limited during retraction by a stop fixed within the cylinder, which is engaged by the piston at the conclusion of its upward travel within the cylinder.

Further in accordance with the present invention, structure is provided for maintaining proper orientation of the fluid flow detection device. Particular structure, in accordance with the present invention, for maintaining proper orientation of the fluid flow detection device can be a guide pin connected between the stem and the cylinder to prevent axial rotation of the stem.

DESCRIPTION OF THE DRAWINGS

A more complete appreciation of the invention and many of the attendant advantages and features thereof can be obtained by reference to the following detailed description of a preferred embodiment taken in connection with the accompanying drawings which illustrate the particular preferred embodiment throughout the several views and wherein:

FIG. 1 is a perspective view of a retractable insertion flowmeter apparatus in accordance with the present invention in position on a section of pipeline; and FIG. 2 is a cross-section of the retractable flowmeter apparatus embodiment shown in FIG. 1.

DETAILED DESCRIPTION OF A PREFERRED EMBODIMENT

Referring now to the drawings, and more particularly to FIG. 1 thereof, there is shown a retractable insertion flowmeter apparatus 10 in accordance with the present invention installed on a pipeline section 12. Insertion flowmeter apparatus 10 is mounted on a riser 14 attached to the side wall of pipeline section 12 to extend laterally of the direction of fluid flow within the pipeline. The riser 14 is welded to pipeline section 12 at its low end and carries a flange 16 on its upper end. After the flange is formed on riser 14, insertion flowmeter apparatus 10 can be bolted at its lower end to flange 16.

As shown in FIG. 1, in the inserted position, rotor 20 is positioned within the interior of pipeline section 12. It will, of course, be readily appreciated that the vanes of the rotor should be oriented transverse to the longitudinal axis of the pipeline for effective engagement by the fluid flow. The rotor is automatically inserted or retracted in response to control signals applied to apparatus 10. In the particular embodiment shown, these control signals are in the form of pressurized fluid signals, such as hydraulic or pneumatic signals, supplied via lines 22 and 24 from a control valve 26.

In the embodiment shown in FIG. 1, control valve 26 receives a source of pressurizing fluid from the pipeline 12 itself. However, it is to be appreciated that a separate source of pressurized fluid could be provided, such as, for example, by a pressurized tank and pump located at the installation site of apparatus 10. Control of valve 26 can be by electrical signals generated in response to command signals received from, for example, a receiver 30 of a supervisory control system. Accordingly, radio signals containing command information regarding the desired state (i.e., either retracted or inserted) of apparatus 10 are received at the installation site from a remote operator's location and are effective to properly position rotor 20.

As an alternative to the control of apparatus 10 under the direction of supervisory control system commands, contact switches may be provided in pipeline 12 on each side of apparatus 10 and spaced an appropriate distance therefrom. Accordingly, when a pig is run through the pipeline to perform the cleaning of paraffin buildup from the interior wall of the pipeline, rotor 20 can be retracted in response to the actuation by the pig of a switch placed ahead of apparatus 10 in the pipeline. After the pig has passed, the rotor can be reinserted into the pipeline flow through the actuation of a second switch by the pig downstream of apparatus 10.

Referring now to FIG. 2, automatically retractable insertion flowmeter apparatus 10 comprises an elongate cylinder 32 of a uniform cross-sectional diameter. At the lower end 34 of the cylinder 32, a mounting flange 36 is provided for attaching apparatus 10 to flange 16 atop riser 14. A gasket 38 is provided at the interface between mounting flange 36 and flange 16. At the upper end 33 of cylinder 32, an end plate 40 is provided which includes a flange 42 that extends transverse to the center line axis of cylinder 32. End plate 40 is inserted into the upper end 33 of cylinder 32 and includes a seal 44 that extends around its periphery adjacent the inner wall of cylinder 32. End plate 40 is firmly held within the upper end 33 of cylinder 32 by tie bolts 46 extending between mounting flange 36 and end plate flange 42. Although only one tie bolt is shown in the drawing of FIG. 2, approximately six such tie bolts symmetrically distributed about the circumference of cylinder 32 is preferred.

Extending longitudinally through cylinder 32 is a stem 48 of uniform diameter. Stem 48 extends completely through cylinder 32 and out the ends through mounting flange 36 and end plate 40. A seal 50 is provided in end plate 40 adjacent the outside surface of stem 48 to prevent the passage of pressurized fluid out of cylinder 32 around stem 48 at the upper end 38. Correspondingly, a seal 52 is provided in mounting flange 36.

A piston 54 is secured to stem 48 and carries dual ring seals 56 and 58 about its outer perimeter to prevent the leakage of pressurized fluid around piston 54. It will of course be appreciated that a buildup of a pressure differential across piston 54 in one direction or the other will be effective to more stem 48 vertically within cylinder 32 effecting insertion or retraction of turbine rotor 20.

Pressurized fluid for acting on piston 54 to move stem 48 axially within cylinder 32 is admitted through either port 62 in end plate 40 or through port 64 in mounting flange 36. Port 62 communicates with the interior of cylinder 32 above piston 54 through an annulus 66 formed concentrically around stem 48. Pressurized fluid supplied to port 64 is introduced into cylinder 32 below piston 54 through an annulus 68 which extends concentrically around stem 48. Port 64 and annulus 68 are interconnected by a duct 70.

In order to provide a source of pipeline pressure for use in effecting movement of piston 54 within cylinder 32, port 72 is provided in mounting flange 36 and communicates with the interior of riser 14 through an interconnecting duct 74. As shown, duct 74 extends laterally through mounting flange 36 and opens into a cavity 76 which is formed within the body of mounting flange 36. Cavity 76 is symmetrically formed around the opening through which stem 48 extends and is sized to have an internal diameter equal to that of the riser 14.

To direct the travel of stem 48 during insertion and retraction and prevent axial rotation thereof, guide pins 78 and 80 are provided. Both guides pins are secured for movement with stem 48 and extend parallel to stem 48 on opposite sides thereof. More specifically, the upper ends 82, 84 of guide pins 78 and 80, respectively, are held in a yoke 86 that is secured to the upper end of stem 48. The lower ends 88, 90 of guide pins 78 and 80 extend through guide openings in the flange portion 42 of end plate 40. The openings in flange 42 for guide pins 78, 80 are sized to permit the pins to freely slide therein, but are of sufficiently close tolerance to prevent excessive lateral movement during insertion or retraction. Guide pins 78 and 80 maintain proper orientation of turbine rotor 20 during insertion into the pipeline flow. To limit the travel of stem 48 and set the proper depth of insertion of turbine rotor 20, the bottom surface of yoke 86 will move into abutment with stop surface 92 on the top side of end flange 42 at the lower limit of travel of stem 48. Accordingly, the depth of insertion of stem 48 through riser 14 into pipeline 12 is set by the relative positioning of yoke 86 with respect to the stop surface 92. To permit use of the apparatus 10 with pipelines of different sizes, which necessitates a different extent of travel for stem 48, the positioning of yoke 86 with respect to stop surface 92 is made adjustable. It will be appreciated that with yoke 86 adjusted downwardly along stem 48 the distance that stem 48 can travel before yoke 86 abuts surface 92 will be reduced.

Upward travel of stem 48 during retraction is limited by the abutment of the top surface of piston 54 against the bottom surface 96 of end plate 40 which extends into cylinder 32. In limiting the extent of travel of stem 48 during retraction, surface 96 acts as a stop for piston 54. The extent to which stem 48 can be retracted is, of course, set by the positioning of piston 54 along the length of stem 48. However, unlike the need for adjustment of the depth of insertion for different pipeline sizes, the extent of retraction of stem 48 would be the same regardless of the size of pipeline with which apparatus 10 is being used. Accordingly, adjustment of piston 54 along stem 48 to set a different limit of upward travel is not required.

A limit switch 94 is provided on end flange 42 to indicate positioning of stem 48 in the fully retracted position. Switch 94 is actuated by a collar 95 carried on guide pin 78.

As shown in FIG. 2, an electrical junction box 98 can be provided on the upper end of stem 48. Electrical leads from a pick-up device within stem 48 at the lower end thereof adjacent turbine rotor 20 extend through stem 48 and terminate at terminal strips within junction box 98. Electrical connections to the electronic units that process the raw data pulses extend from junction box 98 to those units. Stem 48 can also house a temperature sensing element, and the electrical leads from the sensor would also be wired into junction box 98.

Regarding the operation of apparatus 10 in response to control signals in the form of fluid pressure to cylinder 32, it is to be noted that the apparatus can be operated in three-way or four-way action. For example, if the apparatus is to be operated in three-way action, port 64 would be open to atmosphere. Pipeline pressure admitted to port 62 would act against the upper surface of piston 54 and drive stem 48 downwardly, inserting rotor 20 into the pipeline flow. Downward travel of stem 48 would continue until yoke 86 bottoms out on surface 92. For retraction of stem 48 in three-way action, it would only be necessary to vent port 62 to atmosphere and permit pipeline pressure within riser 14 acting on the cross-sectional area of stem 48 to cause it to withdraw from the pipeline. If four-way operation is desired, insertion of stem 48 would be by identical operation to that of three-way operation. However, in retracting stem 48, pipeline pressure would be admitted to port 64 to act on the bottom of piston 54 and drive stem 48 upwardly. Port 62 would be vented to atmosphere during retraction.

The rate of insertion and retraction of the stem in both modes of operation is set by the orifice sizes of ports 62 and 64.

It is to be appreciated that hydraulic cylinder 32 is pressure balanced, i.e., the pressure above piston 54 creating a translating force on stem 48 balances the force exerted on the lower end of stem 48 by the pipeline pressure. Accordingly, peripheral equipment can be utilized with the apparatus of the present invention to provide the capability to increment rotor 20 across the pipeline to provide flow contour data.

The foregoing description of the invention has been directed to a particular preferred embodiment for purposes of explanation and illustration. It will be apparent, however, to those skilled in this art that many modifications and changes in the apparatus may be made without departing from the scope and spirit of the invention. For example, alternative arrangements can be designed for the hydraulic cylinder unit different from that which is shown, such as a purely pneumatic device or an air over hydraulic system. Also, other types of structural arrangements for effecting a limitation of the travel of the stem can be designed. For example, the piston can be utilized to limit stem travel by bottoming out on a surface of the mounting flange that extends into the lower end of the hydraulic cylinder. It is the intention in the following claims to cover all such equivalent modifications and variations as fall within the scope of the invention.

What is claimed is:

1. An automatically retractable insertion flowmeter apparatus for use on a pipeline carrying a flow of fluid therethrough and having a flanged riser extending laterally from the side wall of the pipeline, which comprises:
   means for detecting the flow of fluid in the pipeline;
   an elongate cylinder having a mounting flange on a first end of said cylinder for attachment to the flanged riser, said flange having a port therein communicating with the interior of said cylinder, and a closure on the second end of said cylinder, said closure having a port therein communicating with the interior of said cylinder;
   a piston positioned within said cylinder for longitudinal movment therein between the ends under the influence of pressurized fluid admitted through one or the other of the ports in said closure and said mounting flange;
   a stem extending longitudinally within said cylinder and through said mounting flange, said stem being attached to said piston for movement therewith and having said fluid flow detection means mounted thereon for insertion into and retraction from the pipeline;
   means for selectively directing pressurized fluid through the port in said closure to translate said piston toward the pipeline thereby inserting said fluid flow detection means into the pipeline and for directing pressurized fluid through said mounting flange to translate said piston away from the pipeline thereby withdrawing said fluid flow detection means from the pipeline; and
   adjustable stop means attached to and translating with said stem for selectively varying the travel of said stem through said mounting flange thereby permitting the insertion flowmeter apparatus to be used in different sizes of pipeline.

2. The apparatus of claim 1 wherein said travel varying means comprises a member adjustable relative to said stem for abutment with a stop disposed proximate the first end of said cylinder to permit adjustment of the degree of insertion of said stem and said fluid flow detection means into the pipeline.

3. The apparatus of claim 2 wherein said travel varying means further includes a stop positioned internally of said cylinder for abutment by said piston to limit the travel of said stem during retraction of said fluid flow detection means from the pipeline.

4. The apparatus of claim 1 wherein said travel limiting means comprises:
   a member clamped to said stem;
   a first stop formed on the upper surface of said closure for abutment with said clamped member to limit the travel of said stem during insertion of said fluid flow detection means into the pipeline; and
   a second stop in the interior of said cylinder for abutment with said piston to limit the travel of said stem during retraction of said fluid flow detection means from the pipeline.

5. The apparatus of claim 1 further comprising first and second guide pins extending parallel to said stem and passing through first and second respective openings in said closure to prevent axial rotation of said stem and maintain proper orientation of said fluid flow detection device.

6. The apparatus of claim 1 wherein said mounting flange and said closure each have an annulus formed around said stem that is interconnected with said port and through which pressurized fluid is introduced into said cylinder.

7. The apparatus of claim 6 wherein said mounting flange has a second port for fluid communication with the pipeline riser to provide a source of pressurized fluid for operating said piston within said cylinder.

8. The apparatus of claim 6 wherein said mounting flange and said closure each have a seal positioned about said stem to prevent leakage of fluid from within said cylinder around said stem.

9. The apparatus of claim 1 wherein said fluid flow detection means comprises a turbine meter rotor head.

10. A retractable insertion flowmeter apparatus for pipelines, which comprises:
   (a) means for detecting a flow of fluid in the pipeline;
   (b) means operable in response to a control signal to translate said fluid flow detection means laterally of the fluid flow including a hydraulic cylinder having first and second spaced apart fluid communication ports opening to the interior of the cylinder, a stem extending through said hydraulic cylinder, and a piston within said hydraulic cylinder between the first and second communication ports, said piston being secured to said stem, for inserting or retracting said detection means into or from the pipeline; and
   (c) means for adjustably varying the travel of said insertion or retraction means into the pipeline including a member adjustably attachable along the length of said stem and a stop fixed relative to the cylinder, said member abutting said stop to limit travel of said stem during insertion of said flow detection means into the fluid flow in the pipeline.

11. The apparatus of claim 10 wherein said travel varying means further comprises a stop positioned internally of said cylinder for abutment by said piston upon reaching the upper limits of piston travel within said cylinder.

* * * * *